(12) United States Patent
Ayirala et al.

(10) Patent No.: US 10,648,305 B2
(45) Date of Patent: May 12, 2020

(54) SYSTEMS AND METHODS FOR CARBONATED WATER FLOODING OF HYDROCARBON RESERVOIRS

(71) Applicant: Saudi Arabian Oil Company, Dhahran (SA)

(72) Inventors: Subhash Chandrabose Ayirala, Dhahran (SA); Ali Abdallah Al-Yousef, Dhahran (SA); Sultan Al-Enezi, Dammam (SA); Ahmed Al-Eidan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/005,147

(22) Filed: Jun. 11, 2018

(65) Prior Publication Data

US 2019/0376374 A1 Dec. 12, 2019

(51) Int. Cl.
*E21B 43/16* (2006.01)
*E21B 33/13* (2006.01)

(52) U.S. Cl.
CPC .......... *E21B 43/164* (2013.01); *E21B 33/13* (2013.01)

(58) Field of Classification Search
CPC ......... E21B 43/164; E21B 43/26; E21B 43/16
See application file for complete search history.

(56) References Cited

U.S. PATENT DOCUMENTS

| | | | |
|---|---|---|---|
| 3,342,256 A * | 9/1967 | Bernard | C09K 8/594 166/403 |
| 3,800,874 A * | 4/1974 | Kern | E21B 43/164 166/402 |
| 4,441,555 A | 4/1984 | Shu | |
| 4,448,697 A | 5/1984 | McCoy et al. | |
| 5,695,643 A * | 12/1997 | Brandt | C02F 1/441 166/267 |
| 6,325,147 B1 | 12/2001 | Doerler et al. | |
| 8,657,019 B2 | 2/2014 | Pone | |
| 2012/0090838 A1* | 4/2012 | Collins | E21B 43/164 166/266 |
| 2016/0289539 A1* | 10/2016 | Jangda | C09K 8/584 |

FOREIGN PATENT DOCUMENTS

WO WO-2011/100111 A1 8/2011

OTHER PUBLICATIONS

Abdalla, A. et al., Low Salinity as New Technique of Enhanced Oil Recovery, International Journal of Chemical Engineering and Applications, 8(2): 117-121 (2017).

Alizadeh, A.H. et al., CO2-saturated brine flooding: an effective process for mobilization and recovery of waterflood residual oil, Paper SCA2011-07 presented at the international symposium of the society of the core analysts, Austin, TX, (Sep. 18-21, 2011).

(Continued)

*Primary Examiner* — Silvana C Runyan
(74) *Attorney, Agent, or Firm* — Chaote, Hall & Stewart LLP; Charles E. Lyon; Cristin E. Juda

(57) ABSTRACT

The present disclosure relates to the recovery of oil from an underground hydrocarbon reservoir, and more particularly to systems and methods for carbonated water flooding of an underground reservoir for enhanced oil recovery.

25 Claims, 4 Drawing Sheets

(56) References Cited

OTHER PUBLICATIONS

Alizadeh, A.H. et al., Multi-scale experimental study of carbonated water injection: an effective process for mobilization and recovery of trapped oil, Fuel, 132: 219-23 (2014).

Bachu, S. and Bennion, D.B, Dependence of $CO_2$-brine interfacial tension on aquifer pressure, temperature and water salinity, Energy Procedia, 1: 3157-3164 (2009).

Carvalho, P.J. et al., Carbon dioxide solubility in aqueous solutions of NaCI: measurements and modeling with electrolyte equations of state, Fluid Phase Equilibria, 388: 100-106 (2015).

Lee, J.H. et al., Geochemical Modelling of Carbonated Low Salinity Water Injection CLSWI to Improve Wettability Modification and Oil Swelling in Carbonate Reservoir, Society of Petroleum Engineers, SPE-184915-MS, 12 pages. (2017).

Lee, J.H. and Lee, K.S., Enhanced Wettability Modification and $CO_2$ Solubility Effect by Carbonated Low Salinity Water Injection in Carbonate Reservoirs, Journal of Chemistry, 2017 (Article ID 8142032): 10 pages (2017).

Mosavat, N. and Torabi, F., Performance of Secondary Carbonated Water Injection in Light Oil Systems, Ind. Eng. Chem. Res., 53: 1262-1273 (2014).

Sohrabi, M. et al., Improved Oil Recovery and Injectivity by Carbonated Water Injection, Centre for Enhanced Oil Recovery and $CO_2$ Solutions, Institute of Petroleum Engineering, Heriot-Watt University, Edinburgh, Scotland, presentation at the International Symposium of the Society of Core Analysts held in Aberdeen, Scotland, UK, SCA2012-05, 12 pages (Aug. 27-30, 2012).

Zuo, L. et al., Micromodel investigations of $CO_2$ exsolution from carbonated water in sedimentary rocks, Advances in Water Resources, 53: 188-197 (2013).

International Search Report for PCT/IB2018/056447, 6 pages (dated Jan. 10, 2019).

Written Opinion for PCT/IB2018/056447, 11 pages (dated Jan. 10, 2019).

Al Shalabi, E.W., Modeling the Effect of Injecting Low Salinity Water on Oil Recovery from Carbonate Reservoirs, Dissertation, The University of Texas at Austin, Chapter 2: Literature Review pp. 53-55, 61-64, and 72-80 and Chapter 8: Applications of Geochemistry pp. 543-557 (Dec. 2014).

Alvarez, A.C. et al., The effect of carbon dioxide in oil recovery from calcite reservoirs. Part I., Report of the National Institute of Pure and Applied Mathematics (IMPA), pp. 1-10 (Dec. 14, 2016).

\* cited by examiner

SYSTEMS AND METHODS FOR CARBONATED WATER FLOODING OF HYDROCARBON RESERVOIRS

FIELD

The systems and methods described in the present disclosure relate generally to the recovery of oil from an underground hydrocarbon reservoir, and more particularly to systems and methods for carbonated water flooding of an underground reservoir for enhanced oil recovery.

BACKGROUND

During primary oil recovery, oil inside an underground hydrocarbon reservoir is driven to the surface (for example, toward the surface of an oil well) by a pressure difference between the reservoir and the surface. However, only approximately 10% of the oil in an underground hydrocarbon reservoir can be extracted using primary oil recovery. Alternative methods of enhanced oil recovery are therefore commonly used to extract a portion of the remaining oil from underground hydrocarbon reservoirs, following primary oil recovery. In existing methods of enhanced oil recovery, a fluid is typically introduced through an injection well that is in fluid communication with the underground hydrocarbon reservoir in order to re-pressurize the reservoir and displace oil toward the surface. However, only about 15% to 40% of the original oil in a reservoir can be extracted using existing techniques. There is a need for improved methods of enhanced oil recovery for recovering a larger fraction of the oil present in hydrocarbon reservoirs.

SUMMARY

The systems and methods described in the present disclosure provide an approach for recovering oil from an underground hydrocarbon reservoir by flooding the reservoir with a carbonated injection water that is specially prepared to release an increased amount of dissolved gas (for example, $CO_2$ gas) inside the reservoir than is released using existing techniques. The released gas mobilizes otherwise trapped oil remaining in the reservoir and provides a gas drive for displacing the oil towards the surface, thereby improving oil recovery. In certain embodiments, the amount of dissolved gas present in the carbonated injection water is tuned by exploiting the dependence of the solubility of $CO_2$ in water on pressure, temperature, and salinity. For example, carbonated injection water is prepared at a relatively low temperature and salinity (for example, compared to the ambient temperature or the temperature of the underground hydrocarbon reservoir or compared to the salinity of formation water in the underground reservoir) to provide an increased concentration of dissolved $CO_2$ gas compared to that obtained at a greater temperature or increased salinity. In certain embodiments, the systems and methods described in the present disclosure exploit the physical and chemical conditions inside common hydrocarbon reservoirs to facilitate the release of dissolved $CO_2$ gas. For example, because of the high temperature of reservoirs and high salinity of formation water in reservoirs, $CO_2$ solubility of carbonated injection water decreases inside the reservoir. This localized decrease in $CO_2$ solubility facilitates the release of $CO_2$ gas from the carbonated injection water in the reservoir, improving oil recovery. Furthermore, the methods and systems described in the present disclosure do not require costly chemical additives in order to improve oil recovery. Oil may thus be recovered at a decreased cost while the introduction of such chemicals into the environment is mitigated in the vicinity of the reservoir. The present disclosure provides various configurations of methods and systems for carbonated water flooding of an underground hydrocarbon reservoir.

In one aspect, the present disclosure is directed to a method for carbonated water flooding of an underground hydrocarbon reservoir. The method includes a step of introducing a volume of carbonated injection water that is saturated with carbon dioxide into an underground hydrocarbon reservoir via an injection well. The volume of carbonated injection water is introduced into the injection well at a temperature less than 50° C. and a carbon dioxide pressure greater than 1450 psi, and the carbonated injection water includes one or more salts at a total combined salt concentration of 7,000 ppm or less (where ppm is measured on a mass basis). As used in the present disclosure, in certain embodiments, carbon dioxide pressure refers to the pressure under which carbonated injection water is exposed to carbon dioxide gas.

In certain embodiments, the carbonated injection water includes the one or more salts at a total combined salt concentration in a range from 5,000 to 7,000 ppm. In certain embodiments, the one or more salts are selected from the group consisting of a calcium-containing salt, a magnesium-containing salt, a sulfate-containing salt, and combinations thereof. In certain embodiments, the carbonated injection water includes a combined concentration of calcium and magnesium ions of at least 200 ppm and a concentration of sulfate ions of at least 400 ppm. In certain embodiments, the carbonated injection water includes a combined concentration of calcium and magnesium ions in a range from 200 to 500 ppm and a concentration of sulfate ions in a range from 400 to 1,000 ppm.

In certain embodiments, the carbonated injection water includes carbon dioxide at a mole fraction of at least 0.001. In certain embodiments, the carbonated injection water includes carbon dioxide at a mole fraction in a range from 0.005 to 0.05.

In certain embodiments, the volume of carbonated injection water is introduced into the injection well at a temperature greater than 20° C. and a carbon dioxide pressure less than 7250 psi.

In certain embodiments, the method further includes a step of maintaining the introduced volume of carbonated injection water in the hydrocarbon reservoir so that carbon dioxide gas is released into the underground hydrocarbon reservoir. For example, the introduced carbonated injection water may be maintained in the underground hydrocarbon reservoir for at least 6 hours, for at least 24 hours, for at least 1 week, for at least two weeks, or for at least one month.

In certain embodiments, the method further includes a step of preparing the volume of carbonated injection water in a pressurized and temperature-controlled vessel with an outlet that is in fluid communication with the injection well.

In certain embodiments, the method further includes a step of introducing a volume of chase fluid into the underground hydrocarbon reservoir after the step of introducing the volume of carbonated injection water. In certain embodiments, the chase fluid is or includes carbon dioxide. In certain embodiments, the chase fluid includes water, and a total combined salt concentration of the chase fluid is greater than a total dissolved salt concentration of the carbonated injection water. In certain embodiments, the chase fluid includes polymers, surfactants, or both. For example, the polymers, surfactants, or both in the chase fluid may further improve the extraction of oil from the underground hydrocarbon reservoir.

In certain embodiments, the method further includes a step of decreasing an internal pressure of the underground hydrocarbon reservoir. For example, the internal pressure of the underground hydrocarbon reservoir may be decreased to facilitate the release of carbon dioxide gas from the introduced carbonated injection water. In this embodiment, a difference between the pressure applied to introduce the carbonated injection water to the underground hydrocarbon reservoir (for example, which is typically less than the fracture pressure of the underground formation) and the internal pressure of the underground hydrocarbon reservoir may be utilized as a driving force to release $CO_2$ gas.

In certain embodiments, the carbonated injection water is introduced into the well for injection into the underground hydrocarbon reservoir at a flow rate in a range from 0.5 to 2 cubic meters per minute.

In certain embodiments, prior to introducing the volume of carbonated injection water into the underground hydrocarbon reservoir, a total dissolved salt concentration of the volume of carbonated injection water is less than a total dissolved salt concentration of water in the underground hydrocarbon reservoir, and a temperature of the volume of carbonated injection water is less than a temperature of the water in the underground hydrocarbon reservoir.

In certain embodiments, the method further includes a step of recovering a volume of oil from the underground hydrocarbon reservoir after the step of introducing the volume of carbonated injection water.

In another aspect, the present disclosure is directed to systems for carbonated water flooding of an underground hydrocarbon reservoir. The systems include a pressurized and temperature-controlled vessel. The vessel includes a volume of carbonated injection water that is saturated with carbon dioxide, at a temperature less than 50° C. and a carbon dioxide pressure greater than 1450 psi. The carbonated injection water includes one or more salts at a total combined salt concentration of 7,000 ppm or less. The vessel includes an outlet. The systems include an injection well which is in fluid communication with the outlet of the vessel and an underground hydrocarbon reservoir.

In certain embodiments, the carbonated injection water is at a temperature greater than 20° C. and a carbon dioxide pressure less than 7250 psi.

In certain embodiments, the carbonated injection water includes the one or more salts at a total combined salt concentration in a range from 5,000 to 7,000 ppm. In certain embodiments, the one or more salts are selected from the group consisting of a calcium-containing salt, a magnesium-containing salt, a sulfate-containing salt, and combinations thereof. In certain embodiments, the carbonated injection water includes a combined concentration of calcium and magnesium ions of at least 200 ppm and a concentration of sulfate ions of at least 400 ppm. In certain embodiments, the carbonated injection water includes a combined concentration of calcium and magnesium ions in a range from 200 to 500 ppm and a concentration of sulfate ions in a range from 400 to 1,000 ppm.

In certain embodiments, the carbonated injection water includes the carbon dioxide at a mole fraction of at least 0.001. In certain embodiments, the carbonated injection water includes the carbon dioxide at a mole fraction in a range from 0.005 to 0.05.

BRIEF DESCRIPTION OF THE DRAWING

Drawings are presented in the present disclosure for illustration purposes, not for limitation.

The foregoing and other objects, aspects, features, and advantages of the present disclosure will become more apparent and better understood by referring to the following description taken in conjunction with the accompanying drawing, in which.

DEFINITIONS

Figure 1:
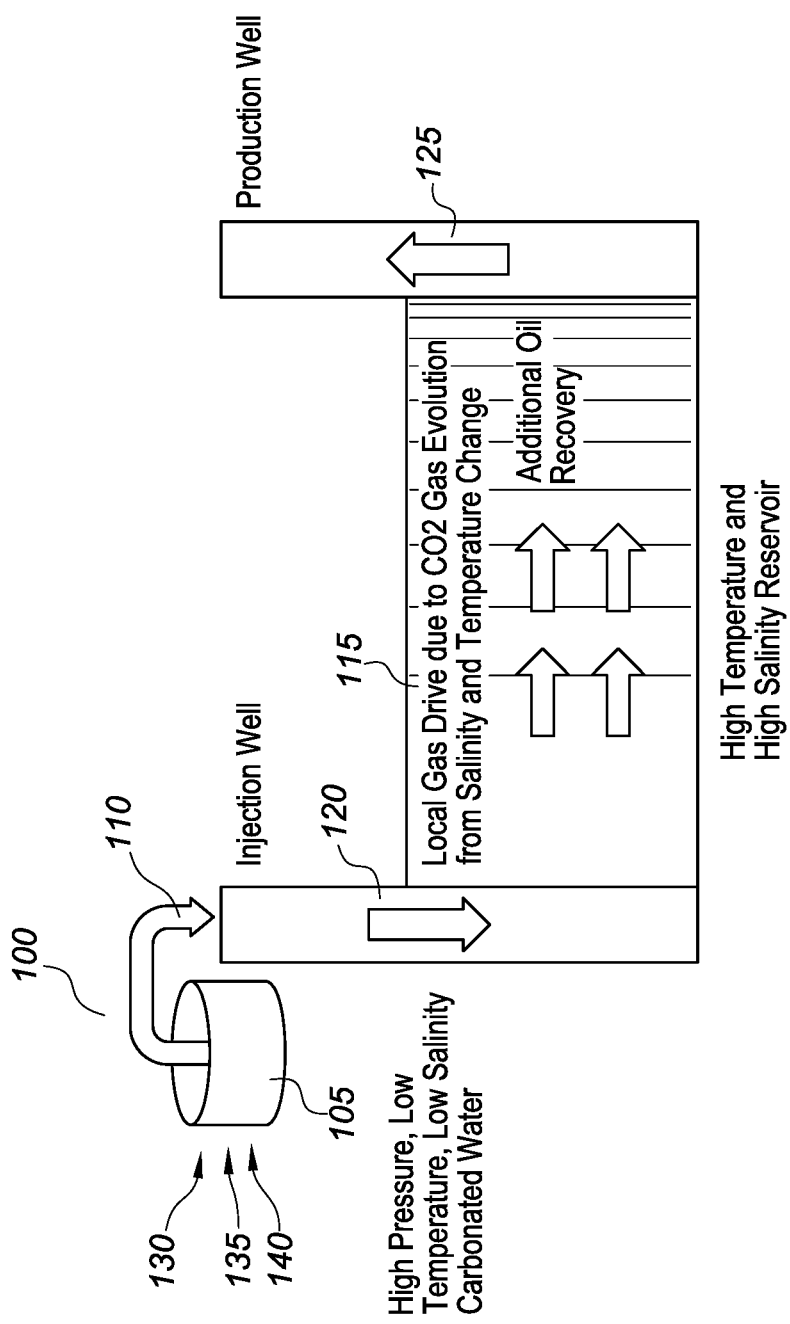
FIG. 1 is a drawing that depicts an example system 100 and its use for carbonated water flooding of an underground hydrocarbon reservoir.

Throughout the specification, several terms are employed that are defined in the following paragraphs. Other definitions may also be found within the body of the specification.

As used in the present disclosure, the terms "about" and "approximately," in reference to a number, are used to include numbers that fall within a range of 20%, 10%, 5%, or 1% in either direction (greater than or less than) of the number unless otherwise stated or otherwise evident from the context (except where such number would exceed 100% of a possible value).

As used in the present disclosure, the term "bottom-hole pressure" generally refers to the pressure measured in a well at or near the depth of an associated underground hydrocarbon reservoir. In certain embodiments, the bottom-hole pressure is calculated, for example, based on a measured or estimated surface pressure, based on a measured or estimated hydrostatic pressure of the reservoir, or both. In certain embodiments, the bottom-hole pressure is measured directly, for example, using a pressure sensor located inside the reservoir.

As used in the present disclosure, the term "carbonated injection water" refers to water into which carbon dioxide gas under pressure has been dissolved.

As used in the present disclosure, the term "fracture pressure" means the pressure above which the injection of carbonated flood water is likely to cause the rock of an underground hydrocarbon reservoir to become fractured (for example, hydraulically fracture, damaged, or cracked). For example, if the bottom-hole injection pressure of a well exceeds the fracture pressure of an underground hydrocarbon reservoir, the rock of the reservoir may fracture.

As used in the present disclosure, the term "formation water" may refer to the water that is found within the pores of an underground hydrocarbon reservoir. For example, "formation water" may be naturally present within a reservoir. In certain embodiments, the term "formation water" refers to the water in the undisturbed zone around an oil well or to the water in a reservoir following the influx of injection water.

As used in the present disclosure, the term "gas drive" refers to a mechanism (for example, driving force) for mobilizing remaining oil in underground hydrocarbon reservoirs containing dissolved gas, undissolved gas (for example, $CO_2$), or both. For example, "gas drive" may refer to the energy of the expanding gas within the reservoir. A "gas drive" may promote the mobilization and movement of hydrocarbons from an underground hydrocarbon reservoir toward the surface through an oil well.

As used in the present disclosure, the term "gravity segregation" means the tendency of fluids to stratify into different layers because of the force of gravity. In "gravity segregation", the fluid with the highest density settles near the bottom of, for example, a reservoir or column, and the fluid with the lowest density rises to the top of the reservoir or column.

As used in the present disclosure, the terms "improve", "increase", "reduce", "decrease", or their grammatical equivalents, indicate values that are relative to a baseline or other reference measurement. In certain embodiments, an appropriate reference measurement is or includes a measurement in a particular system (for example, in carbonated injection water) under conditions (for example, of pressure, temperature, concentration of one or more salts, or combinations of the same) absent the presence of (for example, prior to) a particular change in these conditions. In certain embodiments, an appropriate reference measurement includes a measurement (for example, of the concentration of dissolved $CO_2$) performed under the conditions at which the carbonated injection water is prepared (for example, under a given pressure, at a given temperature, or in the presence of one or more salts at given concentration(s)). In certain embodiments, an appropriate reference measurement includes a measurement (for example, of the amount of oil recovered) after employing a conventional approach known in the art (for example, $CO_2$ water-alternating-gas (WAG) injection).

As used in the present disclosure, the phrase "mole fraction" means the amount of a constituent expressed in moles divided by the total amount of all constituents in a mixture. For example, the mole fraction of $CO_2$ in a volume of carbonated injection water is defined as the amount of $CO_2$ in the carbonated injection water divided by the total amount (in moles) of all other constituents, including water and any salt(s).

As used in the present disclosure, the term "oil well" means a boring (for example, a drilled hole or tunnel) in the earth that is designed to bring hydrocarbons (for example, oil) from an underground hydrocarbon reservoir to the surface. In certain embodiments, an "oil well" is referred to as a "well." For example, a "well" may provide fluid communication between the surface and an underground hydrocarbon reservoir. Injection well 120 and production well 125 of FIG. 1 are illustrative examples of oil wells.

As used in the present disclosure, the phrase "release of dissolved $CO_2$" refers to the degasification of dissolved $CO_2$ gas from a solvent (for example, the carbonated injection water described in the present disclosure). Upon a decrease in the solubility of $CO_2$ in water (for example, after the decrease in the solubility of $CO_2$ following an increase in temperature, salinity, or both), dissolved $CO_2$ gas may, for example, be released from the carbonated injection water. For example, $CO_2$ gas may be released from carbonated injection water as bubbles of $CO_2$ gas.

As used in the present disclosure, the term "salinity" refers to the measure of all salt(s) dissolved in a solvent (for example, water or carbonated injection water). As used in the present disclosure, salinity is often reported in parts per million (ppm). As used in the present disclosure, the term "parts per million" refers to a measure on a mass basis of one part of a solute (for example, a salt) per 1 million parts of a solvent (for example, water). For example, 1 ppm may correspond to a concentration of 1 milligram (mg) of a salt in 1 kilogram (kg) of water. As used in the present disclosure, the term "formation water salinity" refers to the salinity of the formation water of an underground hydrocarbon reservoir.

As used in the present disclosure, the term "solubility" refers to the extent to which one substance (for example, a solute such as $CO_2$ gas) dissolves in another substance (for example, a solvent such as water). As used in the present disclosure, the "solubility of $CO_2$ in water" refers to the amount (for example, mole fraction) of $CO_2$ that dissolves in water under a given set of conditions (for example, of temperature, pressure, and salinity). As used in the present disclosure, the "solubility of $CO_2$ in water" is also referred to as "$CO_2$ solubility."

As used in the present disclosure, the term "total dissolved solids" refers to a measure of all inorganic and organic substances contained in a liquid. The substances can be dissolved in the liquid, for example, in a molecular or ionized form. The substances can also be suspended in the liquid, for example in a granular or micro-granular form. "Total dissolved solids" can include any mineral(s), salt(s), metal(s), ion(s), or combinations of these dissolved in the formation water.

As used in the present disclosure, the term "underground hydrocarbon reservoir" refers to a subsurface body of rock that includes a hydrocarbon (for example, oil) and has a sufficient porosity and permeability to store and transmit fluids. For example, sedimentary rocks such as carbonate rock and sandstone rock are common reservoir rocks. As used in the present disclosure, an "underground hydrocarbon reservoir" is also referred to as a "reservoir".

DETAILED DESCRIPTION

Throughout the description, where systems or devices are described as having, including, or comprising specific components, or where methods are described as having, including, or comprising specific steps, it is contemplated that, additionally, there are systems or devices of the present approach that consist essentially of, or consist of, the recited components, and that there are methods according to the approach described in the present disclosure that consist essentially of, or consist of, the recited processing steps.

It should be understood that the order of steps or order for performing certain actions is immaterial so long as the systems and methods remain operable. Moreover, two or more steps or actions may be conducted simultaneously.

The mention in the present disclosure of any publication, for example, in the Background section, is not an admission that the publication serves as prior art with respect to any of the claims presented in the present disclosure. The Background section is presented solely for purposes of clarity and is not meant as a description of prior art with respect to any claim.

Headers are provided for the convenience of the reader—the presence and/or placement of a header is not intended to limit the scope of the subject matter described in the present disclosure.

The present disclosure encompasses the recognition that the limitations of existing enhanced oil recovery methods (for example, in terms of the limited amount of oil extracted from a reservoir) can be overcome by preparing carbonated injection water under controlled conditions of pressure, temperature, and salinity and introducing the specially prepared carbonated injection water into an underground hydrocarbon reservoir to extract remaining oil. Moreover, the present disclosure encompasses a recognition that (i) the amount of oil extracted from an underground hydrocarbon reservoir during carbonated water flooding may be determined, at least in part, based on the amount of dissolved $CO_2$ gas in the carbonated injection water and the portion of the dissolved $CO_2$ gas that is released (for example, or the rate at which $CO_2$ gas is released) from the carbonated injection water inside the hydrocarbon reservoir and (ii) the dependence of $CO_2$ solubility on temperature, pressure, and salinity can be exploited to increase both the amount of dissolved $CO_2$ gas in the carbonated injection water and the portion of the dissolved $CO_2$ gas that is released inside the reservoir.

I. Methods for Carbonated Water Flooding of an Underground Hydrocarbon Reservoir There are advantages to using the methods described in the present disclosure for carbonated water flooding of an underground hydrocarbon reservoir. For example, the methods described in the present disclosure exploit the dependence of the solubility of $CO_2$ in water on pressure, temperature, salinity, and combinations of these in order to both (i) introduce carbonated injection water with a desired concentration of dissolved $CO_2$ gas into an underground hydrocarbon reservoir and (ii) facilitate the release of this dissolved $CO_2$ gas when the carbonated injection water is inside the reservoir. Underground hydrocarbon reservoirs often have relatively high temperatures (for example, of about 100° C. or greater) and contain water with a high salinity (for example, of about 250,000 ppm total dissolved solids). In certain embodiments, the release of $CO_2$ from carbonated injection water in an underground hydrocarbon reservoir reduces gravity segregation of hydrocarbons within the reservoir and provides a gas drive to mobilize otherwise inaccessible oil for its extraction.

Figure 2:
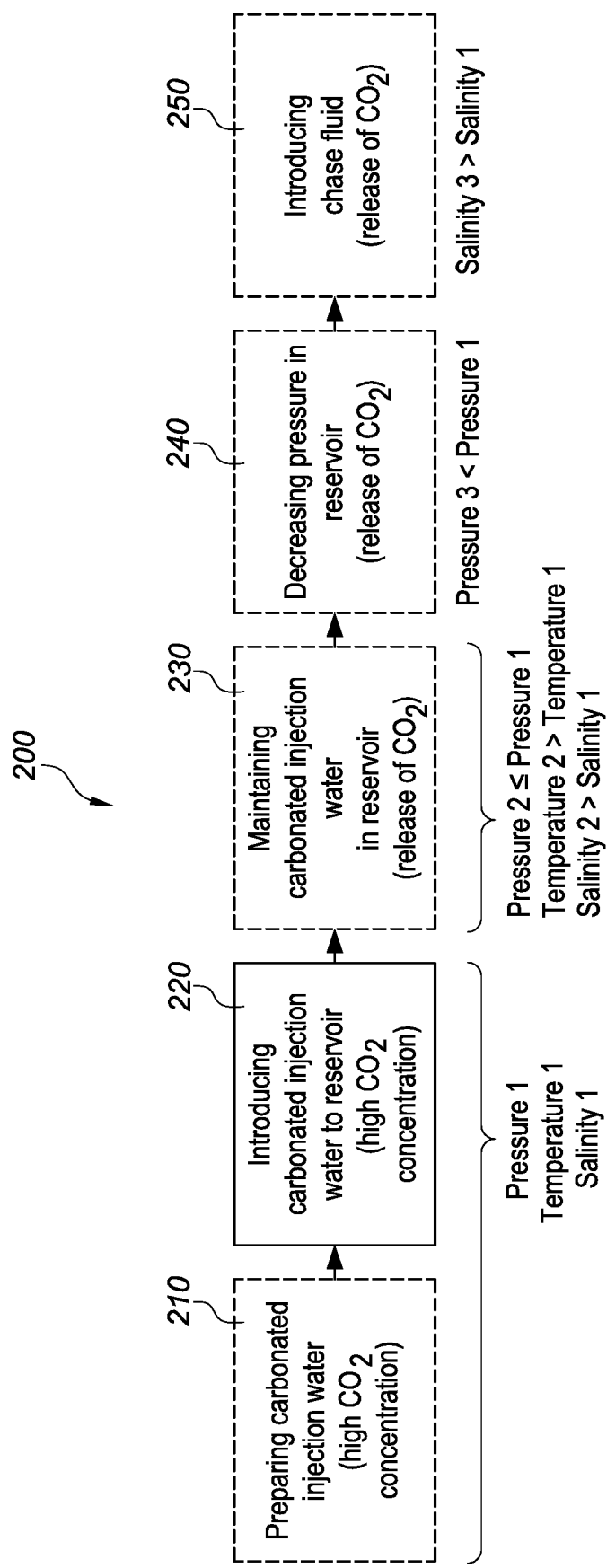
FIG. 2 is a block flow diagram depicting a method 200 of carbonated water flooding, according to an illustrative embodiment.

As shown in the illustrative example of FIG. 2, method 200 for carbonated water flooding of an underground hydrocarbon reservoir includes introducing a volume of carbonated injection water in Step 220 into an underground hydrocarbon reservoir via an injection well. The volume of carbonated injection water is saturated with carbon dioxide and is introduced into the injection well at a temperature less than 50° C. and a carbon dioxide pressure greater than 1450 psi. The carbonated injection water also includes one or more salts at a total combined salt concentration of 7,000 ppm or less.

Figure 3:
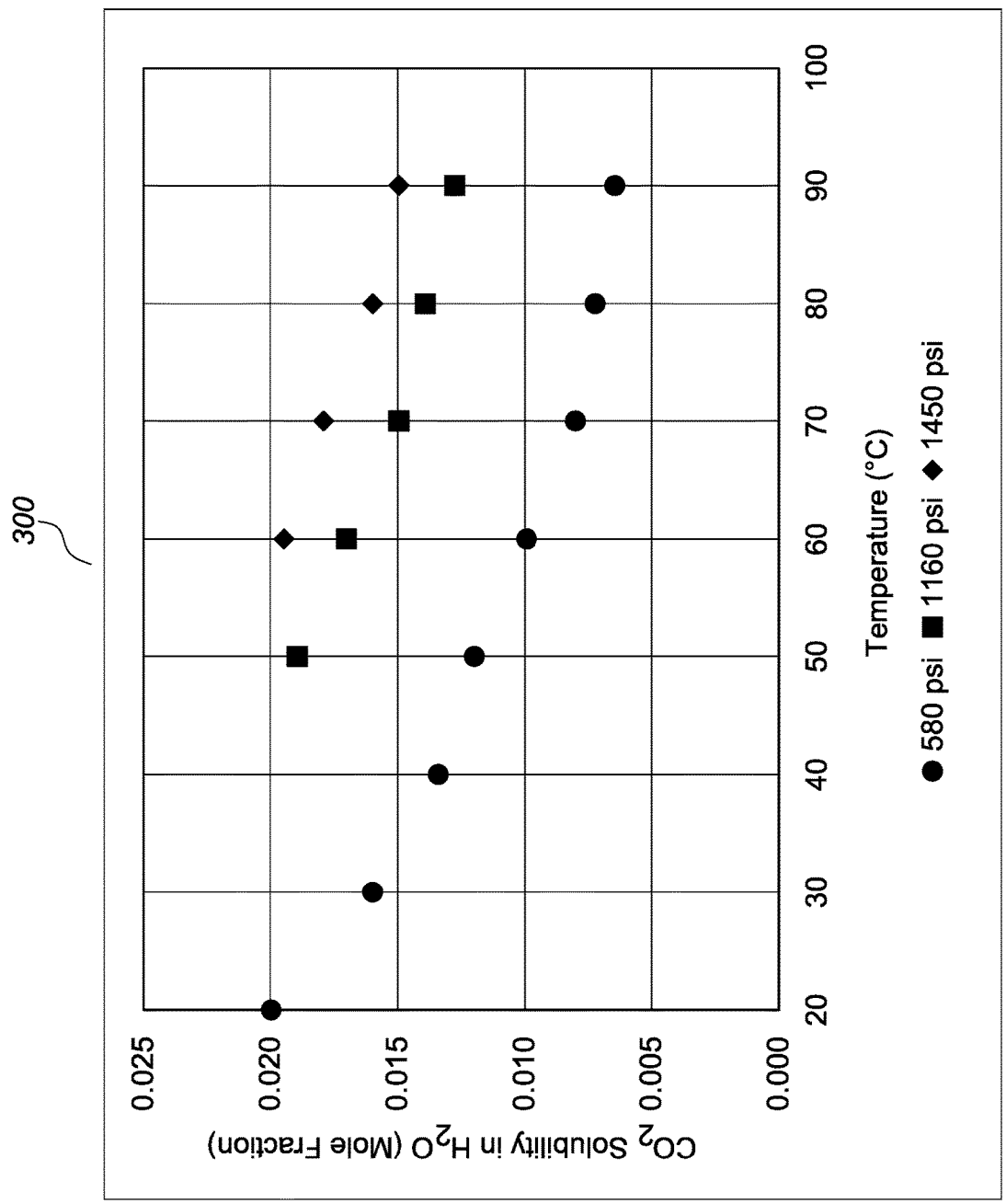
FIG. 3 is a graph 300 showing example $CO_2$ solubility versus temperature plots at different pressures, according to data from Carvalho et al., Carbon dioxide solubility in aqueous solutions of NaCl: Measurements and modeling with electrolyte equations of state, *Fluid Phase Equilibria*, 388:100-106, 2015.

The carbonated injection water is introduced under conditions that correspond to a relatively high concentration of dissolved $CO_2$ gas based on the dependence of $CO_2$ solubility on pressure, temperature, and the concentration of one or more salts present in the carbonated injection water. For example, FIG. 3 shows a graph 300 of the solubility of $CO_2$ in distilled water versus temperature at pressures of 580 psi, 1160 psi, and 1450 psi, according to data from Carvalho et al. (2015). As shown in FIG. 3, the $CO_2$ solubility and associated concentration in mole fraction of dissolved $CO_2$ gas increase with increasing pressure (at each temperature). Accordingly, other conditions (for example, of temperature and salinity) being the same, carbonated injection water introduced at a greater pressure may have an increased concentration of dissolved $CO_2$ gas. This dissolved $CO_2$ gas is available for subsequent release inside an underground hydrocarbon reservoir to improve oil recovery.

Referring still to FIG. 3, the $CO_2$ solubility and associated concentration in mole fraction of dissolved $CO_2$ gas increases with decreasing temperature (at each pressure). For example at 20° C., the mole fraction of dissolved $CO_2$ gas in a volume of distilled water is approximately 0.02, while the mole fraction of dissolved $CO_2$ gas in the same volume of distilled water decreases to about 0.01 (a decrease of about 50%) at the increased temperature of 60° C. (at a constant pressure of 580 psi). Accordingly, other conditions (for example, of pressure and salinity) being the same, carbonated injection water introduced to an underground hydrocarbon reservoir at a lesser temperature has a greater concentration of dissolved $CO_2$ gas. This dissolved $CO_2$ gas is then available for subsequent release inside the underground hydrocarbon reservoir for improved oil recovery.

In certain embodiments, the concentration of dissolved $CO_2$ gas in carbonated injection water is controlled by adjusting the pressure and temperature of the introduced carbonated injection water. For example, as described previously, the concentration of dissolved $CO_2$ gas in the carbonated injection water increases when the pressure of the introduced carbonated injection water is increased (for example, relative to ambient pressure). The pressure of the introduced carbonated injection water can be increased, for example, by exposing the carbonated injection water to gaseous $CO_2$ at an increased pressure, increasing the pressure in a vessel in which the carbonated injection water is prepared or stored prior to injection, or both. As used in the present disclosure, this pressure under which the carbonated injection water is exposed to carbon dioxide is sometimes referred to as "carbon dioxide pressure." The concentration of dissolved $CO_2$ gas in the carbonated injection water increases when the temperature of the carbonated injection water is decreased (for example, relative to ambient temperature). Accordingly, in certain embodiments, the volume of carbonated injection water is introduced into the injection well at a temperature greater than 20° C. and a carbon dioxide pressure less than 7250 psi. In other embodiments, the carbonated injection water is introduced at a temperature in a range from about 0° C. to about 15° C.

Figure 4:
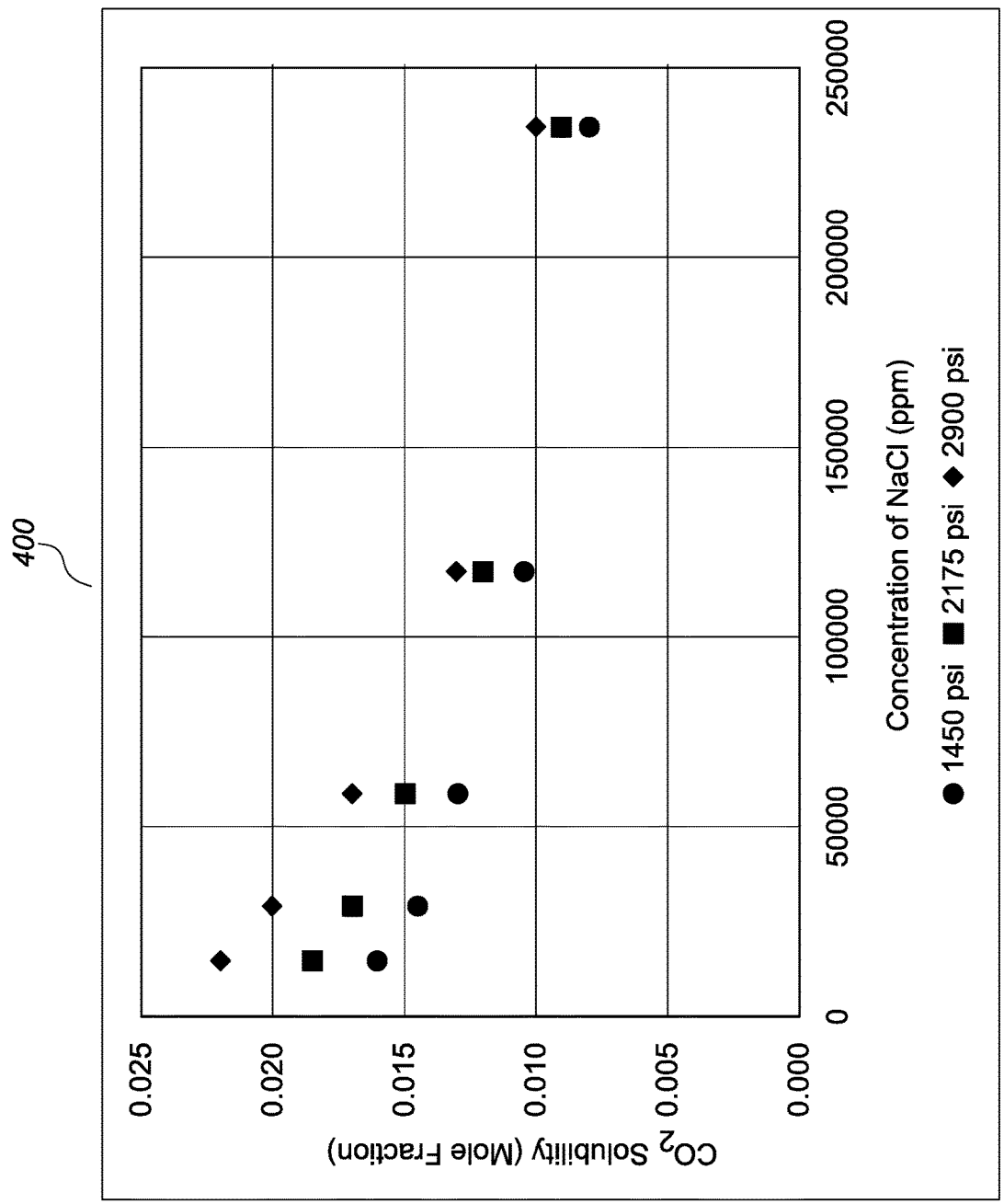
FIG. 4 is a graph 400 showing example $CO_2$ solubility versus weight percent (wt. %) of sodium chloride plots at different pressures and at 80° C., according to data from Carvalho et al. (2015).

FIG. 4 shows a graph 400 of the concentration in mole fraction of dissolved $CO_2$ gas in water versus the concentration of NaCl salt in water at a temperature of 80° C. and pressures of 1450 psi, 2175 psi, and 2900 psi, according to data from Carvalho et al. (2015). As shown in FIG. 4, the $CO_2$ solubility and associated concentration (in mole fraction) of dissolved $CO_2$ gas increases with decreasing salt concentration (in this illustrative example, the salt is NaCl). Accordingly, other conditions (for example, of temperature and pressure) being the same, carbonated injection water introduced into an underground hydrocarbon reservoir with a lesser concentration of salt(s) has a greater concentration of dissolved $CO_2$ gas. The increased concentration of dissolved $CO_2$ gas is then available in the carbonated injection water for subsequent release inside the reservoir for improved oil recovery.

The carbonated injection water may include one or more salts to modify the concentration of dissolved $CO_2$ present in the carbonated injection water. For example, the ionic composition of the carbonated injection water may be tailored to facilitate the release of dissolved $CO_2$ gas after injection into a hydrocarbon reservoir and to favorably alter the wettability of the reservoir for improved oil recovery. For example, to achieve a favorable alteration of rock wettability in carbonates, both the salinity and ionic composition of the carbonated injection water is important. The carbonated injection water, in certain embodiments, includes one or more salts at a total combined salt concentration in a range from 5,000 to 7,000 ppm.

In certain embodiments, the one or more salts include a calcium-containing salt (for example, $CaCl_2$ or $CaCO_3$) a magnesium-containing salt (for example, $MgCl_2$ or $MgCO_3$), a sulfate-containing salt (for example, $Na_2SO_4$, $CaSO_4$, or $MgSO_4$), or combinations of the same. In certain embodiments, the carbonated injection water includes a combined concentration of calcium and magnesium ions of at least 200 ppm and a concentration of sulfate ions of at least 400 ppm. In certain embodiments, the carbonated injection water includes a combined concentration of calcium and magnesium ions in the range of 200 to 500 ppm and a concentration of sulfate ions in the range of 400 to 1,000 ppm. In certain embodiments, the volume of carbonated injection water also includes other common salts such as those containing sodium and chloride ions (for example, NaCl). Table 1 shows the ionic composition of an example volume of carbonated injection water, according to certain embodiments.

TABLE 1

Example ions in carbonated injection water

| Ions | Symbol | Composition (ppm) |
| --- | --- | --- |
| Sodium | $Na^+$ | 1,824 |
| Calcium | $Ca^{2+}$ | 65 |
| Magnesium | $Mg^{2+}$ | 211 |
| Sulfate | $SO_4^{2-}$ | 429 |
| Chloride | $Cl^-$ | 3,220 |
| Bicarbonate | $HCO_3^-$ | 12 |
| Total dissolved solids: | | 5,761 |

In certain embodiments, the ionic composition of a volume of carbonated injection water that is introduced into an underground hydrocarbon reservoir is selected such that it is chemically compatible with the formation water in the reservoir. In other words, the ionic composition of the carbonated injection water may be selected to avoid undesirable chemical reactions (for example, in situ $H_2S$ generation) which lead to scaling and reservoir souring. For example, excess sulfate, calcium, and magnesium in the carbonated injection water may react with barium, strontium, and calcium in formation water. These reactions may result, for example, in the unwanted formation of barium sulfate (barite), strontium sulfate (celestite), and calcium sulfate scales and deposits. These mineral scales and deposits can disrupt oil extraction processes and decrease the efficiency of oil recovery. Additionally, sulfates present in the carbonated injection water may, for example, react with organic materials (for example, water soluble organic components of the crude oil found in the reservoir) in the presence of sulfate reducing bacteria, which can be found in underground hydrocarbon reservoirs, to produce $H_2S$ in the reservoir. The carbonated injection water described in the present disclosure can thus be formulated to mitigate against the formation of mineral scales and deposits and the formation of $H_2S$ inside the reservoir.

The ability to control the concentration of dissolved $CO_2$ gas in carbonated injection water results in advantages for certain embodiments of the methods described in the present disclosure. For example, the approach described in the present disclosure allows a volume of carbonated injection water to be introduced that includes a greater concentration of dissolved $CO_2$ than was previously possible. The carbonated injection water described in the present disclosure does not require expensive or caustic chemical additives. One or more salts, which are included in the carbonated injection water in certain embodiments, are selected to prevent the formation of unwanted byproducts, as described previously, and are present at relatively low concentrations (for example, a total combined salt concentration of 7,000 ppm or less). In certain embodiments, carbonated injection water is injected into an underground hydrocarbon reservoir under conditions that correspond to a high $CO_2$ solubility such that more dissolved $CO_2$ gas is present in the carbonated injection water and is subsequently available for release within the underground hydrocarbon reservoir to mobilize remaining oil. In certain embodiments, the carbonated injection water includes $CO_2$ gas at a mole fraction of at least 0.001. In certain embodiments, the carbonated injection water includes $CO_2$ gas at a mole fraction in the range of 0.005 to 0.05.

The volume of carbonated injection water can be introduced via an injection well which is in fluid communication with the underground hydrocarbon reservoir and an outlet of a pipe, vessel, or other container in which the carbonated injection water is transported, stored, prepared, or combinations of these. In certain embodiments, the carbonated injection water is introduced using one or more high pressure pumps. In certain embodiments, the pressure at which the carbonated injection water is pumped into the underground hydrocarbon reservoir is selected such that the bottom-hole pressure of the reservoir is maintained below its fracture pressure to prevent fracturing of the underground hydrocarbon reservoir. For example, in certain embodiments, the carbonated injection water is introduced via the well into the reservoir using a mechanical pump at a flow rate in the range of 0.5 to 2 $m^3/min$.

FIG. 2 shows a block flow diagram of an illustrative example method 200 of carbonated water flooding of an underground hydrocarbon reservoir. Method 200 begins with optionally preparing a volume of carbonated injection water in a pressurized and temperature-controlled vessel (Step 210). As shown in FIG. 2, the carbonated injection water may be prepared under conditions that correspond to a relatively high concentration of dissolved $CO_2$ gas based, for example, on the dependence of $CO_2$ solubility on pressure, temperature, and the concentration of one or more salts present in the carbonated injection water. As described previously, the dependence of $CO_2$ solubility on these conditions is shown in FIG. 3 and FIG. 4. In certain embodiments, the carbonated injection water includes $CO_2$ gas at a mole fraction of at least 0.001. In certain embodiments, the carbonated injection water includes $CO_2$ gas at a mole fraction in the range of 0.005 to 0.05.

In the illustrative example of FIG. 2, the volume of carbonated injection water is prepared at a first pressure (Pressure 1) and a first temperature (Temperature 1) corresponding to a relatively high solubility and thus a relatively high concentration of dissolved $CO_2$ in the carbonated injection water. For example, the Temperature 1 may be less than 50° C. and Pressure 1 may correspond to a carbon dioxide pressure greater than 1450 psi. In certain embodiments, the carbonated injection water is prepared at a temperature greater than 20° C. and a carbon dioxide pressure less than 7250 psi. In certain embodiments, during its preparation, the carbonated injection water is cooled to a temperature of about 0° C. to about 15° C. during its preparation.

As shown in the illustrative example of FIG. 2, the volume of carbonated injection water is prepared at a first concentration of one or more salts (Salinity 1). Salinity 1 may be selected, for example, to correspond to a high solubility of $CO_2$ in the carbonated injection water (for example, as described previously with respect to FIG. 4). For example, the carbonated injection water may include one or more salts at a total combined salt concentration of 7,000 ppm or less. In certain embodiments, the carbonated injection water may include one or more salts at a total combined salt concentration in the range of 5,000 to 7,000 ppm. In certain embodiments, the one or more salts may be or include a calcium-containing salt (for example, $CaCl_2$ or $CaCO_3$) a magnesium-containing salt (for example, $MgCl_2$ or $MgCO_3$), a sulfate-containing salt (for example, $Na_2SO_4$, $CaSO_4$, or $MgSO_4$), or combinations of the same. In certain embodiments, the carbonated injection water may include a combined concentration of calcium and magnesium ions of at least 200 ppm and a concentration of sulfate ions of at least 400 ppm. In certain embodiments, the carbonated injection water may include a combined concentration of calcium and magnesium ions in the range of 200 to 500 ppm and a concentration of sulfate ions in the range of 400 to 1,000 ppm.

Because a range of water sources may be used to prepare carbonated injection water, a preprocessing step (for example, reverse osmosis) is performed, in certain embodiments, to remove salt(s) from the source water prior to preparing a volume of carbonated injection water (for example, by exposing the water to carbon dioxide gas such that CO2 dissolves into the water). For example, seawater (which is available in large quantities and at a low cost near many underground hydrocarbon reservoirs) may be treated using a method of desalination such as reverse osmosis to obtain a volume of water with a low salinity (for example, with a total dissolved salt concentration in the range of 500 to 700 ppm). This desalinated water may then be introduced in parallel or as a mixed stream with seawater to obtain water with a specially tailored salt composition (for example, amount of salt(s), type of salt(s), or both) for preparing carbonated injection water. For example, the desalinated water may be introduced with or mixed with seawater at a ratio of 9 parts desalinated water to 1 part seawater. Additional salt(s) may be added to obtain desired concentration of salt(s). In other embodiments, water for preparing carbonated injection water may be obtained from a source of fresh water (for example, a lake or well). The fresh water may be modified similarly to the desalinated water to obtain a desired concentration of one or more salts, as described previously.

As shown in the illustrative example of FIG. 2, carbonated injection water is introduced into an underground hydrocarbon reservoir (Step 220). For example, the carbonated injection water, which was optionally prepared in Step 210 can be introduced in Step 220. As described previously, this introduction step is performed via an injection well which is, for example, in fluid communication with the reservoir and a vessel or other container in which the carbonated injection water is prepared in Step 210 or stored prior to its introduction into the reservoir. For example, a pipe may fluidically connect a vessel or other container in which the carbonated injection water is prepared, stored, or both to the injection well. In certain embodiments, the pipe, vessel, or other container in which the carbonated injection water is transported, stored, prepared, or the like includes a corrosion resistant material (for example, 316 stainless steel). In certain embodiments, the carbonated injection water is introduced using one or more high pressure pumps. In certain embodiments, the pressure at which the carbonated injection water is pumped into the reservoir is adjusted to maintain the bottom-hole pressure of the reservoir below the fracture pressure of the underground hydrocarbon reservoir to prevent fracturing of the underground hydrocarbon reservoir. In certain embodiments, the carbonated injection water is introduced at a flow rate in the range of 0.5 to 2 $m^3$/min.

The difference in the carbon dioxide pressure of the carbonated injection water as introduced (for example bottom-hole pressure, Pressure 1) and the internal pressure of the hydrocarbon reservoir (for example reservoir pressure, Pressure 2) provides a driving force for the release of $CO_2$ gas from the carbonated injection water inside the reservoir. The carbonated injection water is introduced into a reservoir which has a second pressure (Pressure 2). For example, Pressure 2 may correspond to the reservoir pressure. Pressure 2 is less than or equal to Pressure 1. When Pressure 2 is less than Pressure 1, the solubility of $CO_2$ in the carbonated injection water decreases when the carbonated injection water is within the underground hydrocarbon reservoir. This change in $CO_2$ solubility facilitates the release of $CO_2$ gas from the carbonated injection water. The released $CO_2$ gas provides a gas drive for mobilizing oil for its efficient extraction from the reservoir.

The high temperature (for example, of about 100° C. or greater) of common underground hydrocarbon reservoirs and the high salinity (for example, 250,000 ppm of total dissolved solids) of formation water in these reservoirs can be exploited to facilitate the release of dissolved $CO_2$ from the carbonated injection water following its injection into the reservoir. This decrease in $CO_2$ solubility drives the release of dissolved $CO_2$ gas from the carbonated injection water (for example, as depicted in reservoir 115 of FIG. 1). For example, the carbonated injection water, prepared at a first temperature (Temperature 1) in Step 210, is introduced into a reservoir which has a second temperature (Temperature 2). For example, Temperature 2 may correspond to the temperature of fluids inside the reservoir. Temperature 2 is greater than Temperature 1 such that the solubility of $CO_2$ in the carbonated injection water decreases when it is introduced into the underground hydrocarbon reservoir (Step 220). This decrease in $CO_2$ solubility facilitates the release of dissolved $CO_2$ gas from the carbonated injection water within the underground reservoir for improved oil recovery.

In certain embodiments, carbonated injection water is introduced (for example, in Step 220 of method 200) at a first total combined salt concentration of one or more salts (Salinity 1) into a hydrocarbon reservoir which is at a second total combined salt concentration of one or more salts (Salinity 2). Salinity 1 is less than Salinity 2. For example, Salinity 2 may correspond to the dissolved solids including salts and other minerals, metals, or ions in water occurring naturally in the underground hydrocarbon reservoir (for example, the formation water of the reservoir). Because of this increase in salinity from Salinity 1 to Salinity 2, the solubility of $CO_2$ in the carbonated injection water decreases when it is introduced into the underground hydrocarbon reservoir (Step 220). This decrease in $CO_2$ solubility further facilitates the release of dissolved $CO_2$ gas from the carbonated injection water within the underground reservoir for improved oil recovery.

Referring still to the illustrative example of FIG. 2, the carbonated injection water (introduced to the hydrocarbon reservoir in Step 220) can, optionally, be maintained in the reservoir (Step 230). For example, the carbonated injection water may be maintained within the reservoir for at least 6 hours, for at least 24 hours, for at least 1 week, for at least two weeks, or for at least one month. In certain embodiments, the carbonated injection water is maintained in the reservoir by adjusting a pressure at the top of the injection well (for example, the top-hole pressure of the reservoir) in order to maintain a steady state in which the flow rate of carbonated injection water through the reservoir is negligible or substantially near 0 $m^3$/min. For example, the flow rate of carbonated injection water through an injection well or through the reservoir may be maintained at or below 0.1 $m^3$/min during Step 230. In certain embodiments, maintaining the carbonated injection water in the underground hydrocarbon reservoir includes measuring a downhole pressure of the reservoir continuously and adjusting a top-hole pressure of the reservoir in real-time. For example, the top-hole pressure may be selected to minimize the difference between the top-hole pressure and the bottom-hole pressure of the reservoir. In some embodiments, a flow rate, pressure, or both of fluid in an injection well of the reservoir, in one or more production wells of the reservoir, in the underground reservoir itself, or any combination of these is monitored to adjust the top-hole pressure in real-time in order to actively maintain the carbonated injection water in the underground hydrocarbon reservoir. For example, an electronic controller may be configured to automatically adjust a pressure applied by a pump at the top of the injection well in response to an electronic signal acquired from one or more flow rate sensors, pressure sensors, or both. The one or more sensors may be remotely deployed an injection well of the reservoir, in one or more production wells of the reservoir, in the underground reservoir itself, or any combination of these. The electronic signals produced by the sensors can be transmitted to the controller via a wired connection or a wireless connection (for example, via a radio frequency signal or via wireless Ethernet).

In certain embodiments, maintaining the carbonated injection water in the reservoir accommodates the release of an increased amount of $CO_2$ from the carbonated injection water inside the reservoir. By maintaining the carbonated injection water in the reservoir, as described previously, an increased amount of the $CO_2$ gas in the carbonated injection water can be released inside the underground hydrocarbon reservoir. For example, when the carbonated injection water is maintained in the reservoir, the temperature of the carbonated injection water can increase until a steady state temperature is reached over time, resulting in the release of additional $CO_2$. Similarly, minerals, salts, or both that are present in the underground reservoir can be dissolved in carbonated injection water that is maintained in the reservoir for a period of time. The solubility of $CO_2$ in the carbonated injection water can decrease over time while the carbonated injection water is maintained in the reservoir. This decrease in the solubility of $CO_2$ in the carbonated injection water facilitates the release of dissolved $CO_2$ within the reservoir for improved oil recovery. In addition, when the carbonated injection water is maintained in the reservoir released $CO_2$ can more effectively permeate the porous reservoir, providing an increased gas drive for mobilizing oil.

In certain embodiments, the pressure of the underground hydrocarbon reservoir is, optionally, decreased in Step 240 to further facilitate the release of dissolved $CO_2$ gas from the carbonated injection water. For example, following injection of the carbonated injection water (Step 220), the pressure of the hydrocarbon reservoir may be decreased to a third pressure (Pressure 3), which is less than the first pressure (Pressure 1) at which the carbonated injection water was prepared in Step 210, introduced in Step 220, or both. In other embodiments, the pressure of the reservoir is decreased while the carbonated injection water is maintained in the reservoir. In certain embodiments, the reservoir is de-pressurized by creating an intermittent imbalance or maintaining a continuous imbalance between the rates of injection and production. For example, the rate at which the carbonated injection water is introduced may be slower than the rate of production. For example, one or more injection pumps may be intermittently shut down after a predetermined volume of carbonated injection water is introduced into the reservoir (in Step 220) while a constant overall rate of production is maintained. For example, the volumetric flow rate at which carbonated injection water is introduced in Step 220 may be less than the volumetric flow rate of production. In certain embodiments, water is pumped out of an aquifer that is in fluid communication with the underground hydrocarbon reservoir in order to decrease the reservoir's pressure (for example, to Pressure 3).

Still referring to FIG. 2, a volume of chase fluid is, optionally, introduced (Step 250) into the underground hydrocarbon reservoir. The chase fluid can, for example, be introduced immediately after the carbonated injection water is introduced (in Step 220), after the carbonated injection is optionally maintained in the reservoir for a period of time (Step 230), or after the underground reservoir is optionally de-pressurized (Step 240). In certain embodiments, chase fluid is introduced after or during the implementation of Step 230 for de-pressurizing the reservoir. The chase fluid may, for example, include $CO_2$ gas, water with a third total combined salt concentration of one or more salts (Salinity 3), or both. When the chase fluid includes water at Salinity 3, Salinity 3 is greater than the first total combined salt concentration of the introduced carbonated injection water (Salinity 1). This difference in salinity between the introduced carbonated injection water and the chase fluid facilitates the release of dissolved $CO_2$ inside the reservoir. For example, the chase fluid may include one or more salts at a total combined concentration greater than 7,000 ppm. For example, the chase fluid may include seawater.

In certain embodiments, the chase fluid may include one or more polymers, surfactants, or both in order to further improve oil recovery from the underground hydrocarbon reservoir. For example, one or more polymers, surfactants, or both may be dissolved or distributed in the carbonated injection water (during Step 210) to improve the performance of the carbonated water flooding process by increasing the viscosity of the carbonated injection water (for example, to increase macroscopic sweep efficiency), decreasing the oil/water interfacial tension (for example, to increase microscopic displacement efficiency), or both. One or more polymers, surfactants, or both may be dissolved or distributed in the carbonated injection water (during Step 210) to increase the permeation of the carbonated injection water into porous regions of the reservoir. As used in the present disclosure, the term "sweep efficiency" or "displacement efficiency" refers to a measure of the effectiveness of an enhanced oil recovery agent to contact and displace reservoir fluids at both the microscopic scale (for example, at the length scale of pores in the formation) and the macroscopic scale (for example, at the length scale of the reservoir). The one or more polymers may, for example, be added to the carbonated injection water at a combined concentration in the range of 500 to 1000 ppm in Step 210, before injection into the reservoir (Step 220). In certain embodiments, the added polymer(s) are pH sensitive. For example, the polymers may contain pH-sensitive anionic carboxyl ($COO^-$) groups. At the pH of the as-prepared carbonated injection water, the polymer(s) may be coiled, limiting their effect on the viscosity of the fluid. When $CO_2$ gas is released from the carbonated injection water inside the reservoir, the pH of the carbonated injection water increases (for example, because of a concurrent decrease in the concentration of carbonic acid in the carbonated injection water). Responsive to this increase in pH, the polymer(s) may uncoil, resulting in an increased viscosity of the carbonated injection water inside the reservoir. This localized increase in viscosity may provide an improved sweep efficiency and improved oil recovery.

II. Systems for Carbonated Water Flooding of an Underground Hydrocarbon Reservoir There are advantages to using the systems described in the present disclosure for carbonated water flooding of an underground hydrocarbon reservoir. For example, the systems described in the present disclosure exploit the dependence of $CO_2$ solubility on pressure, temperature, salinity, and combinations of the same (for example, see FIG. 3 and FIG. 4) in order to both (i) introduce carbonated injection water with a desired concentration (for example, mole fraction) of dissolved $CO_2$ gas into an underground hydrocarbon reservoir and (ii) facilitate the release of this dissolved $CO_2$ gas inside the reservoir. The reservoir may have a relatively high temperature (for example, of about 100° C. or greater) and a high formation water salinity (for example, of about 250,000 ppm total dissolved solids). In certain embodiments, the release of dissolved $CO_2$ gas reduces the gravity segregation of hydrocarbons in the reservoir and provides a gas drive for mobilizing and extracting remaining oil (for example, trapped oil ganglia).

FIG. 1 shows a diagram of an example system 100 and its use for carbonated water flooding of underground hydrocarbon reservoir 115, according to certain embodiments of the present disclosure. Vessel 105 includes a sealable lid, one or more inlets, or both for introducing water 130, $CO_2$ gas 135, and one or more salts 140 (if needed) into vessel 105. In certain embodiments, water 130 is seawater, fresh water (for example, obtained from a lake or well), or a combination of both. In certain embodiments, water 130 is specially tailored as described above (for example, with respect to the concentration and type of salt(s) in the water as described previously for Step 210 of example method 200). For example, one or more of the salt(s) 140 may be contacted with water 130 prior to introducing the resulting salt-containing water into vessel 105.

Vessel 105 is pressurized during the preparation of a volume of carbonated injection water in order to increase the concentration of dissolved $CO_2$ gas in the carbonated injection water. In certain embodiments, vessel 105 includes an inlet for introducing $CO_2$ gas at a desired pressure. For example, the inlet may include a valve and a pressure a regulator in fluid communication with a pressurized source of $CO_2$ gas (for example, from a storage tank holding $CO_2$ or a mixture that includes $CO_2$ at an increased pressure). Vessel 105 can also include a pressure sensor for monitoring the pressure of gas (for example, $CO_2$) in vessel 105. Vessel 105 can also include a movable wall (for example, a piston), which can be mechanically adjusted to modify the volume of vessel 105 and thus to control the pressure of gas (for example $CO_2$) in vessel 105. For example, the movable wall can be used in concert with pressure sensor and a pressure controller to adjust the carbon dioxide pressure in vessel 105 to prepare carbonated injection water 110 with a desired concentration of dissolved $CO_2$. For example, the concentration of dissolved $CO_2$ gas may be increased in the carbonated injection water by increasing the pressure under which carbonated injection water is prepared in vessel 105. In certain embodiments, a volume of carbonated injection water is prepared in vessel 105 under a pressure of 14150 psi or greater. For example, a volume of carbonated injection water may be prepared in vessel 105 under a pressure in the range of about 1450 psi to about 7250 psi.

As depicted in FIG. 1, vessel 105 is fluidically connected to underground hydrocarbon reservoir 115 via injection well 120, which is in fluid communication with an outlet of vessel 105 and reservoir 115. For example, a fluid conduit can fluidically connect the outlet of vessel 105 to injection well 120. In certain embodiments, an inlet of injection well 120 includes a valve that allows selection of one or more injection streams, where one of the injection streams includes the carbonated injection 110. Other injection streams can include a chase fluid, as described previously. System 100 can further include one or more mechanical pumps (for example, high pressure pumps), one or more valves, one or more flow meters, one or more controllers, or combinations of these for controlling the flow rate of carbonated injection water 110 into injection well 120. In certain embodiments, the carbonated injection water 110 is introduced through the outlet of vessel 105 at a flow rate in the range of 0.5 to 2 $m^3$/min.

In certain embodiments, vessel 105 is composed of stainless steel (for example, 316 stainless steel) or another corrosion resistant material. Vessel 105 may also include a mixer to facilitate efficient and effective contact of the water 130 with $CO_2$ 135, salt(s) 140, or both. For example, a mixer may allow the carbonated injection water to be more quickly saturated with $CO_2$ gas. In certain embodiments, the mixer is designed and operated to minimize pressure drops within vessel 105. For example, the mixer may be sized to minimize pressure drops within vessel 105, and the mixer may be operated at a rotation rate that minimizes pressure drops within vessel 105.

Still referring to FIG. 1, vessel 105 is temperature-controlled for the preparation of a volume of carbonated injection water 110. For example, vessel 105 may include one or more heating elements, one or more cooling elements, a temperature controller, or combinations of these. For example, the vessel may include one or more heating coils. For example, the vessel may include a circulating water bath surrounding or in contact with one or more external surfaces of the vessel. The temperature of the circulating water bath may be adjusted, for example, by the temperature controller, to increase or decrease the temperature of the vessel. The temperature controller may be in electronic communication with one or more temperature sensors, which may be located, for example, at the inlet, middle, outlet, or combinations of these of vessel 105 to ensure a uniform temperature is achieved inside vessel 105. The temperature controller may adjust the extent of heating or cooling (for example, via an electronic signal transmitted to the heating element(s), cooling element(s), or both) based on temperature measurement data transmitted by the sensor(s) to the controller and a predetermined set-point temperature. For example, the predetermined set-point temperature may be a constant temperature defined by a user. The predetermined set-point temperature may also vary in time, for example, according to a desired, user-defined temperature profile. For example, the temperature controller may be controlled manually by a user of the system or via a graphical user interface associated with the temperature controller.

Referring still to FIG. 1, in certain embodiments, underground hydrocarbon reservoir 115 may be a carbonate reservoir. Common carbonate reservoirs have high temperatures (for example, in a range from approximately 50° C. to 200° C.) and high formation water salinities (for example, from approximately 30,000 ppm total dissolved solids, measured on a mass basis, to 250,000 ppm total dissolved solids). In certain embodiments, reservoir 115 is a sandstone reservoir. It should be understood that the systems and methods described in the present disclosure may be used for any type of hydrocarbon reservoir.

In certain embodiments, the conditions under which the carbonated injection water is prepared, introduced, or both (for example, conditions of temperature, pressure, and total concentration of one or more salts) and the properties of an underground reservoir (for example, the temperature, pressure, and formation water salinity of the reservoir) result in advantages for the systems and methods described in the present disclosure. For example, the high temperature (for example, of about 100° C. or greater) and high formation water salinity (for example, of about 250,000 ppm total dissolved solids) of an underground hydrocarbon reservoir may result in a local decrease in $CO_2$ solubility inside the reservoir. This localized decrease in $CO_2$ solubility may facilitate the release of dissolved $CO_2$ gas from the carbonated injection water when it is inside the reservoir. Thus, dissolved $CO_2$ may be preferentially released from the carbonated injection water inside the reservoir where it is most needed for improving oil recovery.

As shown in the illustrative example of FIG. 1, underground hydrocarbon reservoir 115 may be at an elevated temperature and salinity compared to the temperature and salinity of the carbonated injection water prepared in vessel 105. The increase in the temperature and salinity of the carbonated injection water and the decrease in pressure upon introduction into reservoir 115 (depicted by the gradient in the illustration of reservoir 115) may result in a localized decrease in the solubility of $CO_2$. For example, $CO_2$ solubility decreases with increasing temperature and increasing salinity as shown in FIG. 3 and FIG. 4, respectively. This decrease in $CO_2$ solubility may facilitate, for example, the release of dissolved $CO_2$ from the carbonated injection water. The released $CO_2$ gas may mobilize remaining oil (for example, trapped oil ganglia) from reservoir 115, allowing for the recovery of otherwise inaccessible oil from the reservoir.

In the illustrative example of FIG. 1, the mobilized oil exits underground reservoir 115 through production well 125 along with at least a portion of the carbonated injection water. In other embodiments, two or more production wells may be used to recover oil from reservoir 115. In still other embodiments, a single well may be used as the injection well and production well. For example, a volume of carbonated injection water may be introduced into the reservoir and flow may be stopped for an interval of time to maintain the carbonated injection water in the reservoir, as described previously. Following the period of time during which flow is stopped, the mobilized oil may be collected through the same well used for injection.

As described previously, a localized decrease in $CO_2$ solubility inside the reservoir can drive the release of dissolved $CO_2$ gas from the carbonated injection water for improved oil recovery. As an illustrative example of this localized decrease in $CO_2$ solubility and related release of dissolved $CO_2$ gas, Table 2 shows calculated values for the percent reduction in $CO_2$ solubility upon introduction of carbonated injection water, prepared in distilled at 20° C. and 580 psi, into an underground hydrocarbon reservoir with a temperature in the range of 30 to 90° C. at a constant pressure of 580 psi.

As shown in Table 2, the percent reduction in $CO_2$ solubility increases from 20% to 67.5% when the temperature of the hydrocarbon reservoir is increased from 30 to 90° C. According to the calculated values presented in Table 2, approximately 67.5% of the dissolved $CO_2$ gas in a volume of carbonated injection water prepared at 20° C. and 580 psi can be released inside an underground reservoir with a temperature of 90° C. and a pressure of 580 psi. In certain embodiments, the pressure of the underground hydrocarbon reservoir is less than the pressure under which the volume of carbonated injection water is prepared or introduced into the reservoir. For example, the pressure inside the reservoir may be less than the pressure (580 psi) at which the carbonated injection water was prepared in the illustrative example conditions used to calculate the values presented in Table 2. When the pressure of the reservoir is less than the pressure of at which the carbonated injection water is prepared (580 psi for the illustrative example of Table 2), more than 67.5% of the dissolved $CO_2$ gas may be released from the carbonated injection water inside a reservoir with a temperature of 90° C.

TABLE 2

Solubility of $CO_2$ in Distilled Water at 580 psi

| Temperature (° C.) | $CO_2$ Solubility (Mole Fraction) | % Reduction in $CO_2$ Solubility* |
|---|---|---|
| 20 | 0.0200 | |
| 30 | 0.0160 | 20.0 |
| 40 | 0.0135 | 32.5 |
| 50 | 0.0120 | 40.0 |
| 60 | 0.0100 | 50.0 |
| 70 | 0.0080 | 60.0 |
| 80 | 0.0073 | 63.5 |
| 90 | 0.0065 | 67.5 |

*percent reduction in solubility at each temperature is calculated with respect to the solubility of $CO_2$ at 20° C. Data from Carvalho et al., (2015)

Referring again to FIG. 1, underground hydrocarbon reservoir 115 may have an increased formation water salinity (for example, from about 30,000 ppm to about 250,000 ppm total dissolved solids). After being exposed to this high salinity formation water (for example, in reservoir 115), the salinity of the carbonated injection water may increase. FIG. 1 depicts an increase in salinity near the entrance to underground hydrocarbon reservoir 115 (for example, as the gradient near the interface between reservoir 115 and injection well 120). For example, the salinity of a volume of carbonated injection water prepared in vessel 105 may increase upon entering hydrocarbon reservoir 115. As described previously with respect to FIG. 4, an increase in salinity (for example, an increase in the concentration of NaCl as depicted in FIG. 4) results in a decrease in $CO_2$ solubility. A localized decrease in $CO_2$ solubility within reservoir 115 facilitates the release of dissolved $CO_2$ gas from the carbonated injection water. This localized release of $CO_2$ inside the reservoir is beneficial for improving oil recovery.

As an illustrative example of the localized release of dissolved $CO_2$ gas in a reservoir with a high formation water salinity, Table 3 shows calculated values for the percent reduction in the $CO_2$ solubility of a carbonated injection water, prepared in water with a NaCl concentration of 5,000 ppm at 80° C. and 2900 psi, upon introduction into an underground hydrocarbon reservoir with a formation water salinity in the range of 5,000 to 234,000 ppm and at a constant pressure of 2900 psi and a constant temperature of 80° C.

TABLE 3

CO$_2$ Solubility in Aqueous NaCl at 2900 psi and 80° C.

| Salinity (ppm) | CO$_2$ Solubility (Mole Fraction) | % Reduction in Solubility* |
|---|---|---|
| 5000 | 0.023 | |
| 14625 | 0.022 | 4.3+ |
| 29250 | 0.020 | 13.0 |
| 58500 | 0.017 | 26.1 |
| 117000 | 0.013 | 43.5 |
| 234000 | 0.010 | 56.5 |

*percent reduction in solubility at each salinity is calculated with respect to the solubility of CO$_2$ at 5,000 ppm NaCl. Data from Carvalho et al., (2015).
+The solubility of CO$_2$ at a salinity of 5,000 ppm was obtained by linearly extrapolating from the solubility data at salinity values of 14625, 29250 and 58500 ppm.

As shown in Table 3, the percent reduction in CO$_2$ solubility increases from 4.3% to 56.5% when the formation water salinity of the hydrocarbon reservoir increases from 14,625 to 234,000 ppm. According to the calculated values presented in Table 3, approximately 56.5% of the dissolved CO$_2$ gas in a carbonated injection water prepared at 5,000 ppm, 2900 psi, and 80° C. is released inside an underground reservoir with a formation water salinity of 234,000 ppm (at the same pressure and temperature).

In certain embodiments, the pressure of the underground hydrocarbon reservoir may be less than the pressure under which the volume of carbonated injection water is prepared, introduced into the reservoir, or both, resulting in a release of greater than 56.5% of the dissolved CO$_2$ gas from the carbonated injection water inside the reservoir. For example, the pressure of the reservoir may be less than the pressure of 2900 psi used as example conditions used to calculate the values presented in Table 3. Moreover, the volume of carbonated injection water may be prepared at a temperature less than that of the underground hydrocarbon reservoir, resulting in a release of greater than 56.5% of the dissolved CO$_2$ gas from the carbonated injection water inside the reservoir. For example, the temperature of the temperature at which the carbonated water is prepared may be less than the temperature of 80° C. used as example conditions to calculate the values presented in Table 3.

We claim:

1. A method for carbonated water flooding of an underground hydrocarbon reservoir, the method including a step of introducing a volume of carbonated injection water that is saturated with carbon dioxide into an underground hydrocarbon reservoir via an injection well, where the volume of carbonated injection water is introduced into the injection well at a temperature less than 50° C. and a carbon dioxide pressure greater than 1450 psi, where the carbonated injection water includes one or more salts at a total combined salt concentration of 5,000 to 7,000 ppm.

2. The method of claim 1, where the one or more salts are selected from the group consisting of a calcium-containing salt, a magnesium-containing salt, a sulfate-containing salt, and combinations thereof.

3. The method of claim 1, where the carbonated injection water includes a combined concentration of calcium and magnesium ions of at least 200 ppm and a concentration of sulfate ions of at least 400 ppm.

4. The method of claim 1, where the carbonated injection water includes a combined concentration of calcium and magnesium ions in a range from 200 to 500 ppm and a concentration of sulfate ions in a range from 400 to 1,000 ppm.

5. The method of claim 1, where the carbonated injection water includes carbon dioxide at a mole fraction of at least 0.001.

6. The method of claim 1, where the carbonated injection water includes carbon dioxide at a mole fraction in a range from 0.005 to 0.05.

7. The method of claim 1, where the volume of carbonated injection water is introduced into the injection well at a temperature greater than 20° C. and a carbon dioxide pressure less than 7250 psi.

8. The method of claim 1, further including a step of maintaining the introduced volume of carbonated injection water in the hydrocarbon reservoir so that carbon dioxide gas is released into the underground hydrocarbon reservoir.

9. The method of claim 1, further including a step of preparing the volume of carbonated injection water in a pressurized and temperature-controlled vessel with an outlet that is in fluid communication with the injection well.

10. The method of claim 1, further including a step of introducing a volume of chase fluid into the underground hydrocarbon reservoir after the step of introducing the volume of carbonated injection water.

11. The method of claim 10, where the chase fluid includes carbon dioxide.

12. The method of claim 10, where the chase fluid includes water, and a total combined salt concentration of the chase fluid is greater than a total dissolved salt concentration of the carbonated injection water.

13. The method of claim 10, where the chase fluid includes polymers, surfactants, or both.

14. The method of claim 1, further including a step of decreasing an internal pressure of the underground hydrocarbon reservoir.

15. The method of claim 1, where the carbonated injection water is introduced at a flow rate in a range from 0.5 to 2 cubic meters per minute.

16. The method of claim 1, where, prior to introducing the volume of carbonated injection water into the underground hydrocarbon reservoir, a total dissolved salt concentration of the volume of carbonated injection water is less than a total dissolved salt concentration of water in the underground hydrocarbon reservoir and a temperature of the volume of carbonated injection water is less than a temperature of the water in the underground hydrocarbon reservoir.

17. The method of claim 1, further including a step of recovering a volume of oil from the underground hydrocarbon reservoir after the step of introducing the volume of carbonated injection water.

18. A system for carbonated water flooding of an underground hydrocarbon reservoir including:
 a pressurized and temperature-controlled vessel that includes a volume of carbonated injection water that is saturated with carbon dioxide, at a temperature less than 50° C. and a carbon dioxide pressure greater than 1450 psi, where the carbonated injection water includes one or more salts at a total combined salt concentration of 7,000 ppm or less, where the vessel includes an outlet; and
 an injection well which is in fluid communication with the outlet of the vessel and an underground hydrocarbon reservoir.

19. The system of claim 18, where the carbonated injection water is at a temperature greater than 20° C. and a carbon dioxide pressure less than 7250 psi.

20. The system of claim 18, where the carbonated injection water includes the one or more salts at a total combined salt concentration in a range from 5,000 to 7,000 ppm.

21. The system of claim 18, where the one or more salts are selected from the group consisting of a calcium-containing salt, a magnesium-containing salt, a sulfate-containing salt, and combinations thereof.

22. The system of claim 18, where the carbonated injection water includes a combined concentration of calcium and magnesium ions of at least 200 ppm and a concentration of sulfate ions of at least 400 ppm.

23. The system of claim 18, where the carbonated injection water includes a combined concentration of calcium and magnesium ions in a range from 200 to 500 ppm and a concentration of sulfate ions in a range from 400 to 1,000 ppm.

24. The system of claim 18, where the carbonated injection water includes the carbon dioxide at a mole fraction of at least 0.001.

25. The system of claim 18, where the carbonated injection water includes the carbon dioxide at a mole fraction in a range from 0.005 to 0.05.

* * * * *